UNITED STATES PATENT OFFICE.

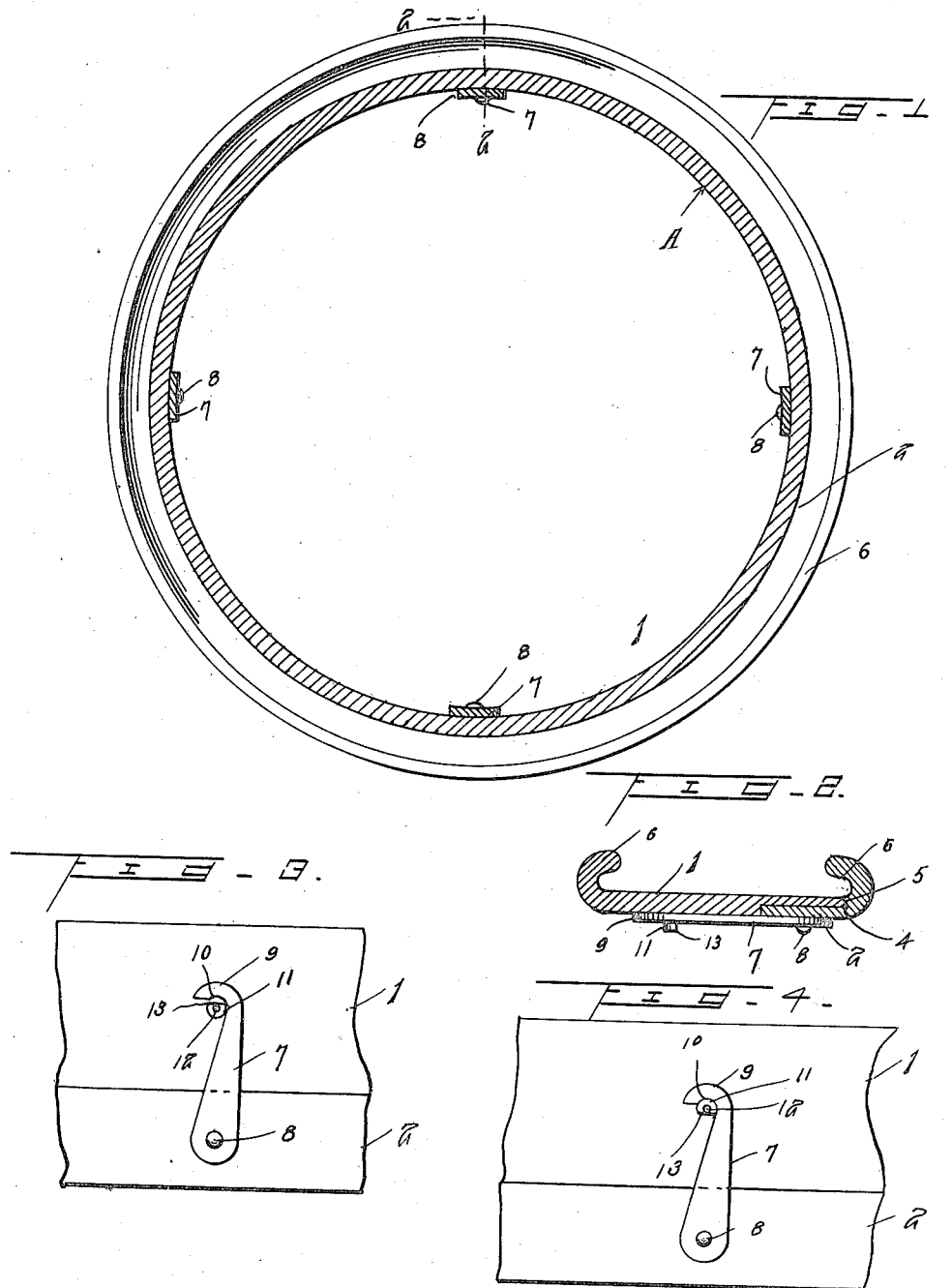

HENRY F. KLEIN, OF ST. ANTHONY, NORTH DAKOTA.

DEMOUNTABLE RIM.

1,239,606.      Specification of Letters Patent.      Patented Sept. 11, 1917.

Application filed November 8, 1916. Serial No. 130,141.

*To all whom it may concern:*

Be it known that I, HENRY F. KLEIN, a citizen of the United States, residing at St. Anthony, in the county of Morton and State of North Dakota, have invented certain new and useful Improvements in Demountable Rims; and I do hereby declare the following to be a full, clear, and exact description of the invention, such as will enable others skilled in the art to which it appertains to make and use the same.

This invention relates to improvements in demountable rims for automobile wheels, and has for its object the provision of a demountable rim that will admit of a tire being conveniently and expeditiously mounted thereon, or removed therefrom, without danger of injury being done to the tire.

Another object of the invention is the provision of a rim of this character, which will be of simple and durable construction, cheap to manufacture, and efficient in operation.

Other objects will appear and be better understood from that embodiment of the invention of which the following is a specification, reference being had to the accompanying drawing forming a part thereof, in which:

Figure 1 is a vertical sectional view taken through the rim detached from operative position, Fig. 2 is a section taken on the line 2—2 of Fig. 1, Fig. 3 is a sectional bottom plan view of the companion sections of which the detachable rim is formed, showing one of the locking devices in unlocked position, Fig. 4 is a sectional bottom plan view of the companion sections of which the rim is formed, showing the locking element in locked position.

Referring to the drawing in detail, the letter A designates, as an entirety, the detachable rim which is formed of companion clamping sections designated 1 and 2, respectively. The sections 1 and 2 when associated form a circular rim which fits over the ordinary wheel felly and is secured thereto in any suitable manner. The width and thickness of the section 1 exceeds the width and thickness of the section 2, and, as shown in Fig. 2 of the drawing, the inner edge of the section 1 is provided with an extension 3, which overlies the upper surface of the section 2, and is provided with a beveled tongue 4, which fits in an undercut groove 5 formed adjacent the outer edge of the section 2. The outer edges of the sections 1 and 2 are provided with clamping flanges 6, which are adapted to engage over the beads formed on a tire casing or shoe.

The section 2 is provided on its inner surface, and at diametrically opposite points, with a plurality of hooks 7, each of the hooks having one end pivoted to the section 2, by means of a pivot pin 8, and has its opposite end provided with a bill 9, the inner side of which is provided with a recess 10. When the clamping sections 1 and 2 are associated the hooks 7 extend across the meeting edges between the sections 1 and 2, and the bills 9 engage over studs 11 that are rotatably mounted on pins 12. The studs 11 are substantially cylindrical shaped, but each stud has one side thereof flattened, as shown at 13. In connecting the bills 9 of the hooks 7 with the studs 11, the studs 11 are rotated to present the flattened faces 13 to the outer edge of the section 1 of the rim. The hooks are then swung in the direction of the studs 11, until the recesses 10 in the bills 9 of the hooks oppose flat faces on the studs 11, as shown in Fig. 3. The studs 11 are then rotated so as to move the curved faces, which are located at points diametrically opposite to the flat faces within the recesses 10 in the bills of the hooks, so as to lock the hooks against swinging movement.

It is evident that various changes might be resorted to in the construction, form and arrangement of the several parts without departing from the spirit and scope of the invention as claimed.

Having thus described my invention what is claimed as new, is:

A detachable wheel rim consisting of a pair of sections, hooks carried by one of the sections and having bills provided with recesses on their inner sides, and studs rotatably mounted on the other section and adapted to be engaged by the bills of the hooks so as to detachably connect the sections to each other, each of the studs being provided at opposite points with flat and curved faces, for the purpose specified.

In testimony whereof I affix my signature in presence of two witnesses.

HENRY F. KLEIN.

Witnesses:
F. M. KLEIN,
JOHN KLEIN.